United States Patent
Xu et al.

(10) Patent No.: US 11,994,668 B2
(45) Date of Patent: May 28, 2024

(54) CAMERA MODULE HAVING CONDUCTIVE MEMBER ELECTRICALLY CONNECTED TO LENS OUTER FRAME AND CIRCUIT SUBSTRATE

(71) Applicant: Kunshan QTech Microelectronics Co., Ltd., Suzhou (CN)

(72) Inventors: Aixin Xu, Jiangsu (CN); Jie Huang, Jiangsu (CN); Lian Xu, Jiangsu (CN); Wei Meng, Jiangsu (CN); Qingyue Huang, Suzhou (CN)

(73) Assignee: KUNSHAN QTECH MICROELECTRONICS CO., LTD., Suzhou (CN)

( * ) Notice: Subject to any disclaimer, the term of this patent is extended or adjusted under 35 U.S.C. 154(b) by 460 days.

(21) Appl. No.: 17/299,808

(22) PCT Filed: Dec. 3, 2019

(86) PCT No.: PCT/CN2019/122513
§ 371 (c)(1),
(2) Date: Jun. 4, 2021

(87) PCT Pub. No.: WO2020/114364
PCT Pub. Date: Jun. 11, 2020

(65) Prior Publication Data
US 2022/0026706 A1 Jan. 27, 2022

(30) Foreign Application Priority Data
Dec. 6, 2018 (CN) .......................... 201811488772.9

(51) Int. Cl.
*G02B 26/08* (2006.01)
*G02B 5/22* (2006.01)
(Continued)

(52) U.S. Cl.
CPC .......... *G02B 26/0825* (2013.01); *G02B 5/22* (2013.01); *H04N 23/54* (2023.01); *H04N 23/55* (2023.01)

(58) Field of Classification Search
CPC ...... G02B 26/0825; G02B 5/22; H04N 23/54; H04N 23/55; H04N 23/57; H04N 23/50; H04M 1/0264
See application file for complete search history.

(56) References Cited

U.S. PATENT DOCUMENTS

| 7,787,199 B2 * | 8/2010 | Tsai ........................ G02B 13/16 |
| | | 396/79 |
| 2011/0299181 A1 * | 12/2011 | Pang ...................... G02B 7/023 |
| | | 359/824 |

(Continued)

FOREIGN PATENT DOCUMENTS

| CN | 1419146 A | 5/2003 |
| CN | 207557556 U | 6/2018 |

(Continued)

OTHER PUBLICATIONS

Search report of CN application No. 201811488772.9 dated Mar. 24, 2023.
First OA of CN application No. 201811488772.9 dated Mar. 28, 2023.

*Primary Examiner* — Luong T Nguyen
(74) *Attorney, Agent, or Firm* — Andrew C. Cheng

(57) ABSTRACT

Provided are a camera module and terminal. The camera module comprises a circuit substrate, an adjustable lens module, a lens, and an auxiliary member. The lens is disposed on the circuit substrate, the adjustable lens module is disposed above the lens. The adjustable lens module comprises a lens outer frame and a lens body. The lens outer frame is fixed to the lens, the lens is disposed in the lens outer frame. A first conductive portion is formed on the lens outer frame, and a second conductive portion is formed on (Continued)

the circuit substrate. The auxiliary member comprises a conductive member. The conductive member is electrically connected to the first conductive portion, and the conductive member is electrically connected to the second conductive portion, so as to electrically connect to the lens outer frame and the circuit substrate.

17 Claims, 3 Drawing Sheets

(51) Int. Cl.
  *H04N 23/54* (2023.01)
  *H04N 23/55* (2023.01)

(56) References Cited

U.S. PATENT DOCUMENTS

2012/0300103 A1* 11/2012 Lu .......................... H04N 23/57
                                                       348/294
2015/0116514 A1*  4/2015 Kim ..................... G02B 27/646
                                                      348/208.4

FOREIGN PATENT DOCUMENTS

| CN | 207560174 U | 6/2018 |
| CN | 207764455 U | 8/2018 |
| CN | 207764528 U | 8/2018 |
| CN | 207780335 U | 8/2018 |
| CN | 207926732 U | 9/2018 |

\* cited by examiner

CAMERA MODULE HAVING CONDUCTIVE MEMBER ELECTRICALLY CONNECTED TO LENS OUTER FRAME AND CIRCUIT SUBSTRATE

CROSS REFERENCE TO RELATED APPLICATION

This application is a 35 U.S.C. § 371 National Phase conversion of International (PCT) Patent Application No. PCT/CN2019/122513, filed on Dec. 3, 2019. The PCT International Patent Application claims priority of Chinese Patent Application No. 20181148872.9, filed on Dec. 6, 2018, and entitled as "Camera Module And Terminal", and was filed and published in Chinese. All of the aforementioned patent applications are hereby incorporated by reference in their entireties.

FIELD OF THE INVENTION

The present invention relates to the field of imaging equipment technology, and more particularly, to a camera module and a terminal.

BACKGROUND OF THE INVENTION

At present, voice coil motors are applied in most of camera modules in mobile phones to focus. A conventional voice coil motor is consist of a carrier, upper and lower springs, magnet, a coil, a base, and a housing. The magnet generates a magnetic field, and the coil generates a current when the coil is energized. The magnetic field and the current generate ampere force to move the carrier up and down. A distance of the carrier driven to move up and down changes by changing the magnitude of the current. The carrier drives the lens to move to achieve the auto-focusing function. The disadvantage of the camera module is that the components such as the coil, the magnet are large in size, complex in structure, and complex in manufacturing process. Magnetic interference occurs when there are multiple motors, and the problem of heat dissipation should be considered. In order to avoid the above problems, the camera module may apply an adjustable lens, thereby omitting components such as magnets and coils. The adjustable lens is consist of glasses, gel and a piezoelectric member. The piezoelectric member is connected to a circuit. The gel deforms from a flat surface into a spherical curved surface because of the expansion and contraction the piezoelectric member, thus achieving the focus function.

However, in a conventional camera module, the adjustable lens is made of semiconductor molding process, and the conductive interface of the adjustable lens is on the back thereof. Generally, the adjustable lens is packaged to form a small package firstly, and the conductive interface of the adjustable lens is connected with a metal portion of an outer frame by gold wire bonding. A supporting bracket is provided outside the lens, the lens is directly disposed in the supporting bracket, the adjustable lens and the outer frame are fixed on the supporting bracket, and a conductive circuit is formed on the outer frame by laser direct structuring (LDS) technology or print direct structuring (PDS) technology. The adjustable lens is electrically connected to the lowermost circuit substrate by the conductive circuit. Therefore, the size of a top portion of the lens module is large.

SUMMARY OF THE INVENTION

In view of above, the present invention provides a camera module and a terminal, which reduces the number of the components of the camera module, reduces a size of atop portion of the camera module, simplifies the camera module, and improves the reliability of the camera module.

The present invention provides a camera module including a circuit substrate. The camera module further includes an adjustable lens module, a lens and an auxiliary member. The lens is disposed on the circuit substrate, the adjustable lens module is disposed above the lens, and the adjustable lens module includes a lens outer frame and a lens body. The lens outer frame is fixed on the lens, the lens body is disposed in the lens outer frame. A first conductive portion is formed on the lens outer frame, and a second conductive portion is formed on the circuit substrate. The auxiliary member includes a conductive member. The conductive member is electrically connected to the first conductive portion, and the conductive member is electrically connected to the second conductive portion to electrically connect the lens frame and the circuit substrate.

Further, the first conductive portion is formed on one side of the lens outer frame, the second conductive portion is formed on one side of the circuit substrate, and the auxiliary member comprising a conductive member, an upper end of the conductive member electrically is connected to the first conductive portion, and a lower end of the conductive member electrically is connected to the second conductive portion.

Further, the auxiliary member is disposed outside the lens, the auxiliary member has an inner surface adjacent to the adjustable lens module and an outer surface far away from the adjustable lens module; the inner surface and the outer surface are disposed between two opposite sides of the circuit substrate, or the inner surface is disposed between two opposite sides of the circuit substrate, and the outer surface is aligned to one side of the circuit substrate.

Further, the adjustable lens module further includes a shading film, and the shading film is disposed above the lens body.

Further, the auxiliary member is disposed on an outer sidewall of the lens.

Further, the auxiliary member further includes a main body, and the conductive member is coated in the main body.

Further, the main body includes a first connecting portion, a second connecting portion and a bending portion. The first connecting portion is adjacent to the adjustable lens module, the second connecting portion is adjacent to the circuit substrate, and the bending portion is connected between the first connecting portion and the second connecting portion. The upper end of the conductive member is exposed from a top portion of the first connecting portion and is electrically connected to the first conducting portion. The lower end of the conductive member is exposed from a bottom portion of the second connecting portion and is electrically connected to the second conductive portion.

Further, the lens includes a lens barrel and a lens substrate. The lens substrate is disposed on the circuit substrate, the lens barrel is disposed on the lens substrate, and the lens outer frame is disposed on the lens barrel.

Further, the first connecting portion, the second connecting portion and the bending portion are disposed against the outer sidewall of the lens barrel.

Further, a positioning opening is defined in the lens substrate, and the positioning opening is disposed on an edge of a side of the lens substrate. The lower end of the conductive member passes through the positioning opening and is electrically connected to the circuit substrate.

Further, the lens barrel includes a fixing portion and a supporting portion to support optic sheets. The fixing portion is coaxially disposed with the supporting portion, and the supporting portion is disposed above the fixing portion. The fixing portion is fixed to the lens substrate, and the lens outer frame is fixed on the supporting portion.

Further, the lens outer frame and the supporting portion are both square-shaped structures, and the lens outer frame is supported by a top surface of the supporting portion and is fixed on the top surface of the supporting portion.

Further, the first conductive portion is a conductive pin, and the upper end of the conductive member is electrically connected to the conductive pin.

Further, the auxiliary member and the lens outer frame are integrally formed by injection molding. The conductive circuit in the lens outer frame is connected with the conductive member to form an integrated body, and then the lens outer frame is bended to make the auxiliary member be arranged on an outer sidewall of the lens.

Further, the lens body includes a piezoelectric film, a deforming portion, a glass, and a conductive block. The deforming portion is disposed between the piezoelectric film and the glass. The conductive block is electrically connected to the conductive circuit in the lens outer frame, and the conductive circuit in the lens outer frame is electrically connected with the first conductive portion.

Further, the camera module further includes a sensor, and the sensor is disposed on the circuit substrate.

The present invention also provides a terminal, and the terminal includes the aforementioned camera module.

The adjustable lens module of the camera module of the present invention is disposed above the lens, the lens is disposed on the circuit substrate, the lens outer frame is fixed on the lens, and the lens body is electrically connected to the circuit substrate via the auxiliary member, therefore a supporting bracket to support the lens may be omitted, components of the camera module is reduced. It is result in that a top size of the camera module is reduced, the structure of the camera module is simplified and the reliability is improved. In addition, the auxiliary member is block shaped, which is convenient for assembly and is compact in structure.

DETAILED DESCRIPTION OF PREFERRED EMBODIMENTS

Figure 1:
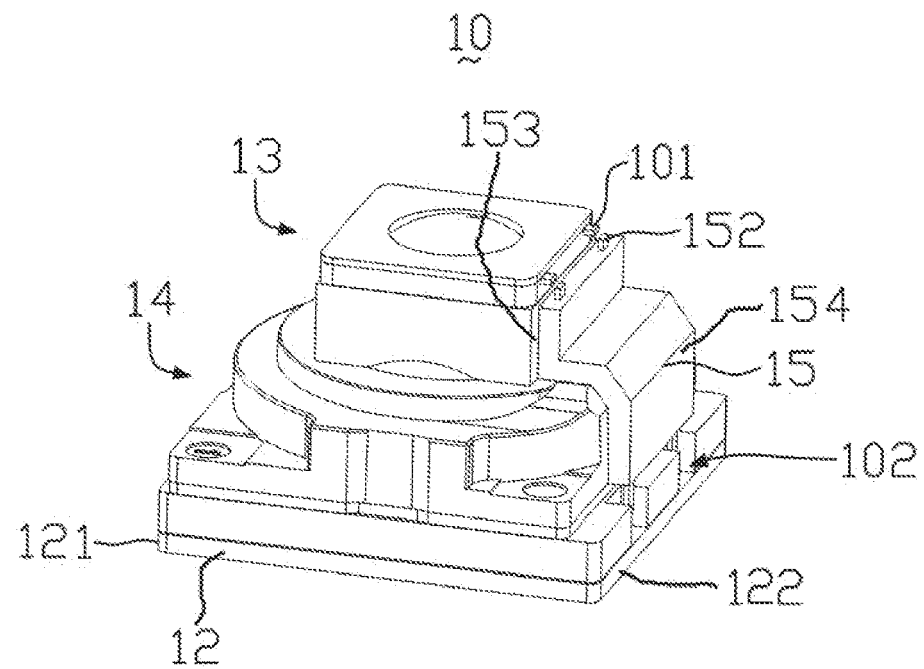
FIG. 1 is a schematic view of a camera module according to a first embodiment of the present invention.

Embodiments of the present invention will now be described in more detail with reference to the drawing figures and specific embodiments. The following embodiments are described to illustrate the present invention, but not to limit the scope of the present invention.

FIG. 1 is a schematic view showing a camera module according to a first embodiment of the present invention.

Figure 2:
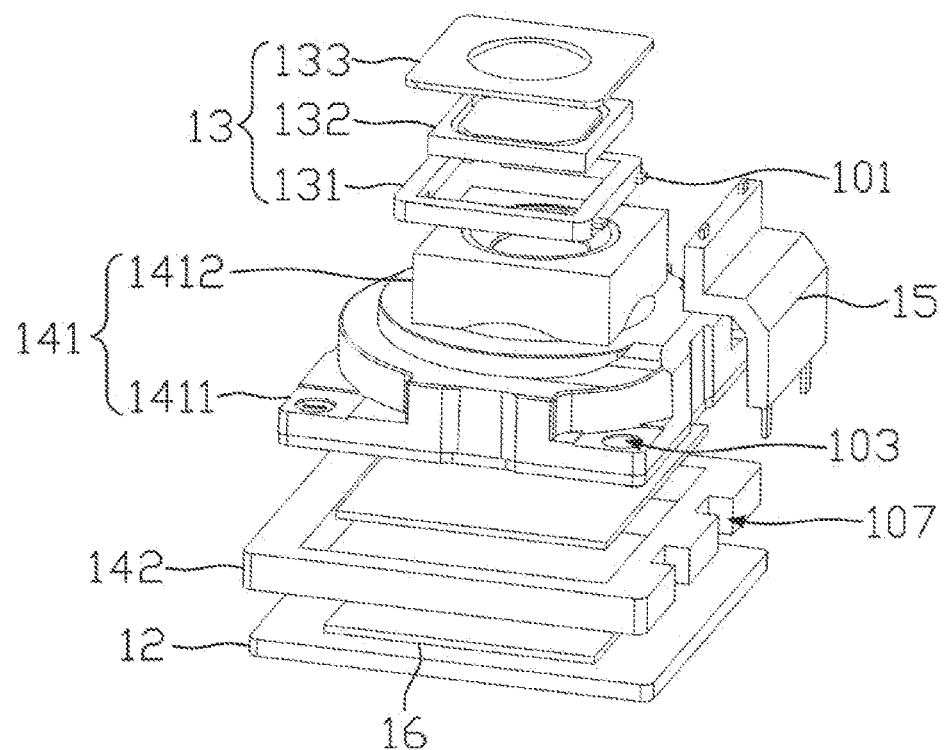
FIG. 2 is an exploded view of the camera module of FIG. 1.

FIG. 2 is an exploded view of the camera module of FIG. 1. Referring to FIGS. 1 and 2, a camera module 10 includes a circuit substrate 12, an adjustable lens module 13, a lens 14, an auxiliary member 15, and a sensor 16. The lens 14 is disposed on the circuit substrate 12, the adjustable lens module 13 is located above the lens 14, and the auxiliary member 15 is located on an outer sidewall of the lens 14. The auxiliary member 15 includes a main body 151 and a conductive member 152 coated in the main body 151. The conductive member 152 is electrically connected between the adjustable lens module 13 and the circuit substrate 12. The sensor 16 is disposed on the circuit substrate 12. In the embodiment, the sensor 16 is an imaging sensor, and the imaging sensor is able to convert light signals into electrical signals. Specifically, in the embodiment, the main body 151 may be formed by injection molding, so that the main body 151 coats on the conductive member 152.

The adjustable lens module 13 includes a lens outer frame 131, a lens body 132, and a shading film 133. The lens body 132 is disposed in the lens outer frame 131, and the shading film 133 is disposed above the lens body 132. The lens frame 131 is fixed on the lens 14. A first conductive portion 101 is formed on one side of the lens outer frame 131, and a second conductive portion 102 is formed on one side of the circuit substrate 12. Two ends of the conductive member 152 expose out from an upper end and a lower end of the main body 151. An upper end of the conductive member 152 is electrically connected to the first conductive portion 101, and the lower end of the conductive member 152 is electrically connected to the second conductive portion 102, thus electrically connecting the lens outer frame 131 and the circuit substrate 12. In this embodiment, the first conductive portion 101 is a conductive pin, and the upper end of the conductive member 152 is electrically connected to the conductive pin. The shading film 133 may employ a shading film applied in lens barrels, a polyester film coated with a black ink layer, or a shading film of other materials.

The auxiliary member 15 is disposed outside the lens 14. The auxiliary member 15 has an inner surface 153 adjacent to the adjustable lens module 13 and an outer surface 154 far away from the adjustable lens module 13. The inner surface 153 and the outer surface 154 are disposed between two opposite sides 121,122 of the circuit substrate 12, or the inner surface 153 is disposed between two opposite sides 121,122 of the circuit substrate 12, and the outer surface 154 is aligned to one side 122 of the circuit substrate 12.

Figure 3:
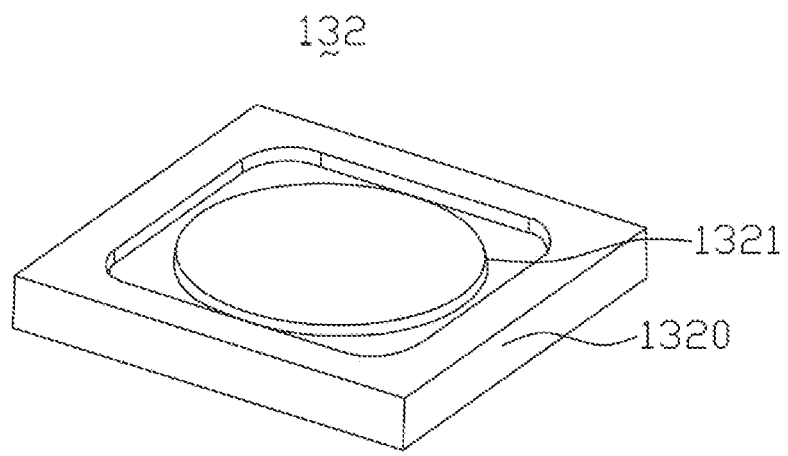
FIG. 3 is a schematic, front view of the lens body of the camera module of FIG. 1.
Figure 4:
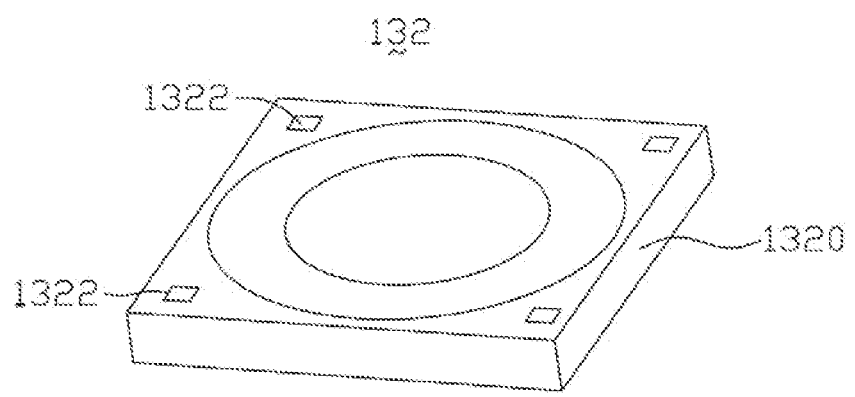
FIG. 4 is a schematic, back view of FIG. 3.

FIG. 3 is a schematic, front view of the lens body of the camera module of FIG. 1. FIG. 4 is a schematic, back view of FIG. 3. Referring to FIGS. 3 and 4, the lens body 132 includes a frame 1320 with an accommodating cavity, a piezoelectric film 1321, a deforming portion (not shown), a glass (not shown), and a conductive block 1322. The accommodating cavity is defined in the middle of the lens body 132. The piezoelectric film 1321, the deforming portion and the glass are all disposed in the accommodating cavity of the frame 1320. The deforming portion is disposed between the glass and the piezoelectric film 1321. The conductive block 1322 is electrically connected to the conductive circuit (not shown) in the lens outer frame 131, and the conductive circuit in the lens outer frame 131 is electrically connected to the first conductive portion 101. When the conductive block 1322 is energized via the first conductive portion 101, the piezoelectric film 1321 generates a force due to the piezoelectric effect to make the deforming portion to deform. For example, the deforming portion may deform from a flat surface into a spherical curved surface, thereby achieving focusing function. Particularly, the deforming portion may be made of high molecular polymer material, more particularly, may be a gel, but it is not limited this. One end of the conductive block 1322 is exposed from the bottom surface of the lens body 132, so as to be electrically connected to the conductive circuit in the lens outer frame 131. In this embodiment, there are four conductive blocks 1322, and the conductive blocks 1322 are positioned on four corners of the lens body 132.

In this embodiment, the piezoelectric film 1321 may be a piezoelectric ceramic film, but is not limited to this. For example, it may also be made of piezoelectric polymer, such as polyvinylidene fluoride (PVDF).

It should be noted that only two adjacent conductive blocks 1322 are employed to electrically connect the lens body 132. Two adjacent conductive blocks 1322 are used as corresponding input and output, and the other two conductive blocks 1322 are spare.

The lens 14 includes a lens barrel 141 and a lens substrate 142. The lens substrate 142 is disposed on the circuit substrate 12, the lens barrel 141 is disposed on the lens substrate 142, and the lens outer frame 131 is disposed on the lens barrel 141.

Further, the lens barrel 141 includes a fixing portion 1411 and a supporting portion 1412 for carrying optic sheets. The fixing portion 1411 and the supporting portion 1412 are coaxially disposed, and the supporting portion 1412 is disposed above the fixing portion 1411. The fixing portion 1411 and the supporting portion 1412 may be integrally formed. The fixing portion 1411 is fixed to the lens substrate 142, and the lens outer frame 131 is fixed on the supporting portion 1412. Particularly, the lens outer frame 131 and the supporting portion 1412 are both square-shaped structures, and the lens outer frame 131 may be supported by a top surface of the supporting portion 1412 and fixed on the top surface of the supporting portion 1412. The optic sheets of the lens 14 are disposed in the supporting portion 1412. In this embodiment, a fixing hole 103 is defined in the fixing portion 1411, and the fixing portion 1411 is fixed to the lens substrate 142 via the fixing hole 103. The lens substrate 142 is mainly used to hold a filter (not shown) of the lens 14.

Figure 5:
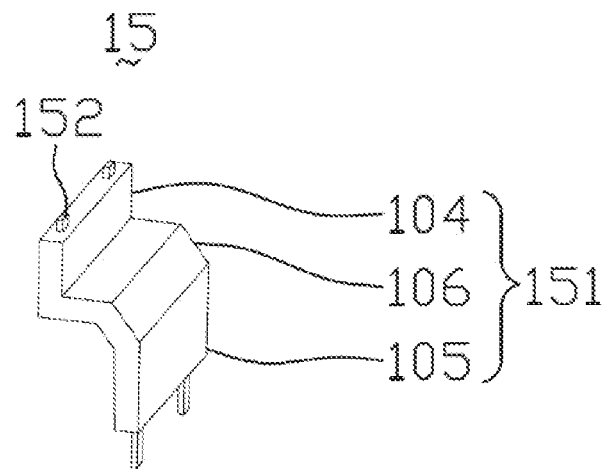
FIG. 5 is a schematic view of the auxiliary member of the camera module of FIG. 1.

FIG. 5 is a schematic view of the auxiliary member of the camera module of FIG. 1. Referring to FIGS. 1 and 5, the main body 151 includes a first connecting portion 104, a second connecting portion 105 and a bending portion 106. The first connecting portion 104 is adjacent to the adjustable lens module 13, and the second connecting portion 105 is adjacent to the circuit substrate 12. The bending portion 106 is connected between the first connecting portion 104 and the second connecting portion 105. The first connecting portion 104, the second connecting portion 105, and the bending portion 106 are disposed against the outer sidewall of the lens barrel 141. Particularly, the first connecting portion 104 is disposed against an outer sidewall of the supporting portion 1412, the second connecting portion 105 is disposed against an outer sidewall of the fixing portion 1411, and the bending portion 106 is disposed against an outer sidewall between the fixing portion 1411 and the supporting portion 1412. The upper end of the conductive member 152 is exposed from the top portion of the first connection portion 104 and is electrically connected to the first conductive portion 101 of the lens outer frame 131. The lower end of the conductive member 152 is exposed from the bottom portion of the second connecting portion 105 and is electrically connected to the second conductive portion 102 of the circuit substrate 12. In this embodiment, the conductive member 152 may be connected to the lens outer frame 131 and the circuit substrate 12 by conductive silver glue or soldering.

It should be noted that in other embodiments, the auxiliary member 15 may be replaced by a metal wire or a flexible circuit board. When the auxiliary member 15 is a metal wire, the metal wire may be disposed on the lens barrel 141. Particularly, the metal wire and the lens barrel 141 are integrality formed by injection molding process, that is, the metal wire is disposed in a sidewall of the lens barrel 141, but it is not limited to this. The top end of the metal wire is exposed from the supporting portion 1412 and is electrically connected to the first conductive portion 101. The bottom end of the metal wire is exposed from the fixing portion 1411 and is electrically connected to the second conductive portion 102. The metal wire is electrically connected between the lens outer frame 131 and the circuit substrate 12 so as to achieve a conductive connection.

In this embodiment, a positioning opening 107 is defined in the lens substrate 142, and the positioning opening 107 is disposed on an edge of the lens substrate 142. The lower end of the conductive member 152 of the auxiliary member 15 passes through the positioning opening 107 and is electrically connected to the circuit substrate 12. The auxiliary member 15 is disposed on an outer side of the lens substrate 142. On one hand, the positioning opening 107 can facilitate to position and assemble the auxiliary member 15, and on the other hand, the positioning opening 107 gives way to the lower end of the conductive member 152 to prevent the outer side of the auxiliary member 15 from protruding beyond an edge of the lens substrate 142. Therefore, the size of the entire camera module 10 is reduced.

Figure 6:
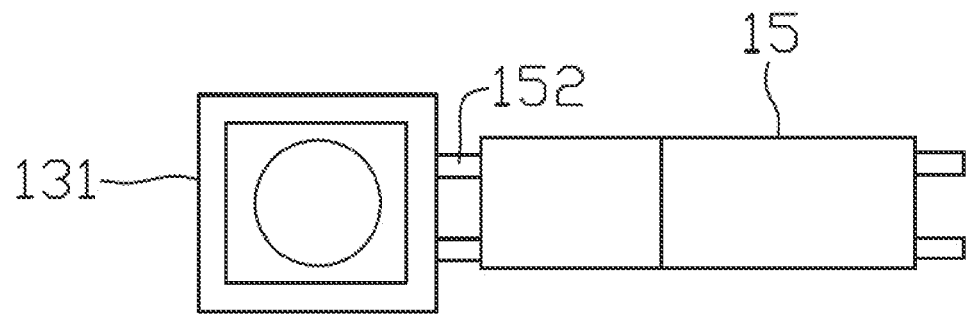
FIG. 6 is a schematic view showing a connecting structure connecting the auxiliary member and the lens outer frame according to a second embodiment of the present invention.
Figure 7:
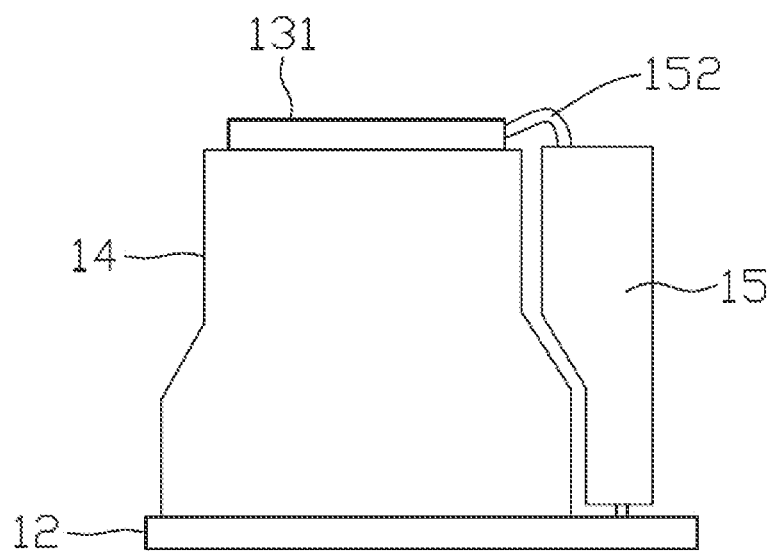
FIG. 7 is a schematic view showing a camera module according to a second embodiment of the present invention.

FIG. 6 is a schematic view showing the connection structure connecting the auxiliary member and the lens outer frame of a second embodiment of the present invention. FIG. 7 is a schematic structural view showing a camera module according to a second embodiment of the present invention. The structure of the camera module of this embodiment is substantially the same as the structure of the camera module of the first embodiment. The difference of the cameral module in this embodiment and the first embodiment is that the connection manner for connecting the auxiliary member 15 and the lens outer frame 131.

Particularly, the auxiliary member 15 and the lens outer frame 131 are formed by injection molding. The conductive circuit in the lens outer frame 131 is connected with the conductive member 152 to form an integrated body, and then the lens outer frame 131 is bended to make the auxiliary member 15 be arranged on an outer sidewall of the lens 14, as shown in FIG. 7.

The principle of the camera module 10 of the present invention is roughly as follows: when the camera module 10 needs to zoom, a voltage required by the adjustable lens module 13 is transmitted to the lens body 132 via the auxiliary member 15, and the lens body 132 deforms when the current is applied on the lens body 132, thereby the lens body 132 can converge or diverge light to achieve the purpose of focusing. That is, the lens body 132 acts as a convex lens or a concave lens. According to the most basic optical principles, both convex lens and concave lens can perform zooming function.

The adjustable lens module 13 of the camera module 10 of the present invention is disposed above the lens 14, the lens 14 is disposed on the circuit substrate 12, the lens outer frame 131 is fixed on the lens 14, and the lens body 132 is electrically connected to the circuit substrate 12 through the auxiliary member 15. Therefore a supporting bracket for supporting the lens 14 may be omitted and the number of components of the camera module 10 is decreased, thereby reducing the top size of the camera module 10 to simplify the structure of the camera module 10 and to improve the reliability of the camera module 10. In addition, the auxiliary member 15 is made into block shape, which is convenient for assembly and is compact in structure.

The present invention also relates to a terminal, and the terminal includes the aforementioned camera module 10.

In this article, unless clearly stipulated and limited, the items "disposed", and "connect" shall be interpreted broadly, for example, it may be a fixed connection, a detachable connection, or an integral connection. It may be a mechanical connection or an electrical connection. It can be directly connected or indirectly connected through an intermediary. For those of ordinary skill in the art, the specific meanings of the above items can be understood under specific circumstances.

The above descriptions are only preferred embodiments of the present invention, and are not intended to limit the present invention. Any modification, equivalent replacement, improvement, etc., which is in the spirit and principle of the present invention should be included in the protection scope of the present invention.

INDUSTRIAL APPLICABILITY

In the camera module of the embodiment of the present invention, the adjustable lens module of the camera module of the present invention is disposed above the lens, the lens is disposed on the circuit substrate, the lens outer frame is fixed on the lens, and the lens body is electrically connected to the circuit substrate via the auxiliary member, therefore a supporting bracket to support the lens may be omitted, components of the camera module is reduced. It is result in that a top size of the camera module is reduced, the structure of the camera module is simplified and the reliability is improved. In addition, the auxiliary member is made into block shaped, which is convenient for assembly and is compact in structure.

What is claimed is:

1. A camera module, comprising:
   a circuit substrate, the camera module further comprising an adjustable lens module, a lens and an auxiliary member; the lens disposed on the circuit substrate, the adjustable lens module disposed above the lens, the adjustable lens module comprising a lens outer frame and a lens body, the lens outer frame fixed on the lens, the lens body disposed in the lens outer frame, and a first conductive portion formed on the lens outer frame, a second conductive portion formed on the circuit substrate, and the auxiliary member comprising a conductive member, the conductive member electrically connected to the first conductive portion, and the conductive member electrically connected to the second conductive portion to electrically connect the lens outer frame and the circuit substrate.

2. The camera module according to claim 1, wherein the adjustable lens module further comprises a shading film, and the shading film is disposed above the lens body.

3. The camera module according to claim 1, wherein the auxiliary member is disposed on an outer sidewall of the lens.

4. The camera module according to claim 1, wherein the auxiliary member further comprises a main body, and the conductive member is coated in the main body.

5. The camera module according to claim 4, wherein the main body comprises a first connecting portion, a second connecting portion and a bending portion, the first connecting portion is adjacent to the adjustable lens module, the second connecting portion is adjacent to the circuit substrate, and the bending portion is connected between the first connecting portion and the second connecting portion, the upper end of the conductive member is exposed from a top portion of the first connecting portion and is electrically connected to the first connecting portion, and the lower end of the conductive member is exposed from a bottom portion of the second connecting portion and is electrically connected to the second conductive portion.

6. The camera module according to claim 5, wherein the lens comprises a lens barrel and a lens substrate, and the lens substrate is disposed on the on the circuit substrate, the lens barrel is disposed on the lens substrate, and the lens outer frame is disposed on the lens barrel.

7. The camera module according to claim 6, wherein the first connecting portion, the second connecting portion and the bending portion are disposed against an outer sidewall of the lens barrel.

8. The camera module according to claim 6, wherein a positioning opening is defined in the lens substrate, and the positioning opening is disposed on an edge of a side of the lens substrate, the lower end of the conductive member passes through the positioning opening and is electrically connected to the circuit substrate.

9. The camera module according to claim 6, wherein the lens barrel comprises a fixing portion and a supporting portion supporting optic sheets, and the fixing portion is coaxially disposed with the supporting portion and the supporting portion is disposed above the fixing portion the fixing portion is fixed to the lens substrate, and the lens outer frame is fixed on the supporting portion.

10. The camera module according to claim 9, wherein the lens outer frame and the supporting portion are both square-shaped structures, and the lens outer frame is supported by a top surface of the supporting portion and fixed on the top surface of the supporting portion.

11. The camera module according to claim 1, wherein the first conductive portion is a conductive pin, and the upper end of the conductive member is electrically connected to the conductive pin.

12. The camera module according to claim 1, wherein the auxiliary member and the lens outer frame are integrally formed by injection molding, and a conductive circuit in the lens outer frame is connected with the conductive member to form an integrated body, and then the lens outer frame is bended to make the auxiliary member be arranged on an outer sidewall of the lens.

13. The camera module according to claim 1, wherein the lens body comprises a piezoelectric film, a deforming portion, a glass, and a conductive block, the deforming portion is disposed between the piezoelectric film and the glass, the conductive block is electrically connected to a conductive circuit in the lens outer frame, and the conductive circuit in the lens outer frame is electrically connected to the first conductive portion.

14. The camera module according to claim 1, wherein the camera module further comprises a sensor, and the sensor is disposed on the circuit substrate.

15. A terminal, characterized in that the terminal comprising the camera module according to claim 1.

16. The camera module according to claim 1, wherein the first conductive portion is formed on one side of the lens outer frame, the second conductive portion is formed on one side of the circuit substrate, an upper end of the conductive member electrically is connected to the first conductive portion, and a lower end of the conductive member electrically is connected to the second conductive portion.

17. The camera module according to claim 1, wherein the auxiliary member is disposed outside the lens, the auxiliary member has an inner surface adjacent to the adjustable lens module and an outer surface far away from the adjustable lens module; the inner surface and the outer surface are disposed between two opposite sides of the circuit substrate, or the inner surface is disposed between two opposite sides of the circuit substrate, and the outer surface is aligned to one side of the circuit substrate.

* * * * *